(12) United States Patent
Richter et al.

(10) Patent No.: US 7,819,709 B2
(45) Date of Patent: Oct. 26, 2010

(54) CONTACT FOR A CONNECTION BOX

(75) Inventors: Michael Richter, Schalksmuehle (DE); Stefan Joergens, Schalksmuehle (DE)

(73) Assignee: Lumberg Connect GmbH, Schalksmuehle (DE)

( * ) Notice: Subject to any disclaimer, the term of this patent is extended or adjusted under 35 U.S.C. 154(b) by 0 days.

(21) Appl. No.: 12/434,706

(22) Filed: May 4, 2009

(65) Prior Publication Data
US 2009/0275247 A1    Nov. 5, 2009

(30) Foreign Application Priority Data
May 3, 2008    (DE)    ........................ 10 2008 022 057

(51) Int. Cl.
*H01R 13/58* (2006.01)
(52) U.S. Cl. ........................ 439/877; 439/879; 439/452
(58) Field of Classification Search ......... 439/865–868, 439/877–882, 516, 452
See application file for complete search history.

(56) References Cited

U.S. PATENT DOCUMENTS

| | | | |
|---|---|---|---|
| 1,654,340 A * | 12/1927 | McIntosh | .................... 403/274 |
| 2,943,293 A | 5/1959 | Bucher | ........................ 339/223 |
| 3,221,294 A * | 11/1965 | Roberts | ........................ 439/877 |
| 4,990,103 A | 2/1991 | Sazaki | ........................ 439/455 |
| 5,675,891 A * | 10/1997 | Childs et al. | .................. 29/879 |
| 5,831,815 A | 11/1998 | Miller | ........................ 361/679 |
| 6,948,970 B2 | 9/2005 | Hayashi | ...................... 439/460 |
| 7,124,501 B2 | 10/2006 | Bender | ........................ 29/840 |
| 7,444,743 B2 | 11/2008 | Feldmeier | .................... 29/748 |
| 2007/0173102 A1 | 7/2007 | Fekonia | ...................... 439/398 |

FOREIGN PATENT DOCUMENTS

| | | |
|---|---|---|
| DE | 7500393 | 1/1975 |
| DE | 8422774 | 10/1984 |

\* cited by examiner

*Primary Examiner*—Gary F. Paumen
(74) *Attorney, Agent, or Firm*—Andrew Wilford

(57) ABSTRACT

A contact for the solar-power feed cable having a conductive core surrounded by an insulating sheath has a conductive contact part adapted to be connected in a solar-power connection box to a conductor and engaging the conductive core of the cable. An outer contact ring is crimped to the sheath longitudinally of the cable inward from the contact part and is unitary with the contact part. An inner contact ring spaced longitudinally inward of the cable from the outer contact ring is crimped to the sheath and formed with a strain-relief flange.

7 Claims, 3 Drawing Sheets

CONTACT FOR A CONNECTION BOX

FIELD OF THE INVENTION

The present invention relates to a contact. More particularly this invention concerns a contact for a solar-panel connection box.

BACKGROUND OF THE INVENTION

A contact for a connection box, in particular for a solar-panel connection box, is normally inserted into a holder in a compartment formed by the connection box and has a contact part that interconnects a first cable and a second cable. The contact is secured by an insulation crimp ring on the electrically insulated outer sheath of the second cable. The second cable also has a strain-relief arrangement in for securing it solidly in the box. This is more fully described in jointly filed and copending applications (atty's 24465 and 24466) whose disclosures are herewith incorporated by reference.

A connection box of this type is known from DE 8 422 774, in which the feed cable is inserted in a groove and is held by a screw-on web to relieve strain in the connection box.

It is also known to provide the side wall of the base that delimits the compartment with threaded sleeves that have crimp tongues. After the feed cable is routed through the threaded sleeve and the wall cutout into the compartment, a nut is screwed onto the threaded sleeve to clamp the tongues against the insulation sheath of the feed cable and thus hold it while relieving strain in the connection box.

Inserting cables for strain relief in a nonstraight groove is also known, which is not possible with the feed cables for solar panels because of their rigidity, however.

The above-described prior art has two disadvantages: On the one hand, separate work steps which are difficult to automate are necessary for the strain-relieving fixing of the feed cable. On the other hand, separate components are necessary to provide a strain-relief arrangement. In view of the rising cost pressure in the manufacturing of the connection boxes of this type, improvements in this regard are needed.

Another solution is known in which contact crimped onto an end of the feed cable is a component of the strain-relief arrangement. The contact is fastened using an insulation crimp ring onto the feed cable. The section of the feed cable provided with insulation crimp ring is inserted in a compartment, implemented by the base of the connection box, to relieve strain.

This strain-relief arrangement works quite well but does not meet a US testing norm for strain reliefs, for example. Specifically, it is stipulated according to this norm that the contact for connection to the connection box of the panel-output cable cannot be a component of the strain-relief arrangement. As a result, according to the testing specification, the feed cable is cut through behind the contact here and the strain-relief testing is then performed. In the above-mentioned example, in which the insulation crimp ring is a component of the contact, this testing routine prevents the strain-relief arrangement from functioning as intended, so the test is failed.

OBJECTS OF THE INVENTION

It is therefore an object of the present invention to provide an improved contact for a solar-panel connection box.

Another object is the provision of such an improved contact for a solar-panel connection box that overcomes the above-given disadvantages, in particular that on the one hand meets requirements for cost-effective and automated manufacturing and, on the other hand passes the stipulated strain-release test.

SUMMARY OF THE INVENTION

A contact for a solar-power feed cable having a conductive core surrounded by an insulating sheath has according to the invention a conductive contact part adapted to be connected in a solar-power connection box to a conductor and engaging the conductive core of the cable. An outer contact ring is crimped to the sheath longitudinally of the cable inward from the contact part and is unitary with the contact part. An inner contact ring spaced longitudinally inward of the cable from the outer contact ring is crimped to the sheath and formed with a strain-relief flange.

This contact is made and installed by the method comprising the steps of providing an elongated one-piece plastically deformable plate having an outer part and an inner part and formed with a narrow integral web between and interconnecting the parts, crimping an outer end of the outer part around a stripped end of a conductor of a cable having inward of the stripped end an insulation sheath, crimping an inner end of the outer part around the insulation sheath of the cable to form an outer crimp ring, crimping the inner part around the insulation sheath inward of the outer part inner end to form an inner crimp ring spaced from the outer crimp ring by the web, and thereafter rupturing the web and thereby separating the inner and outer crimp ring.

The invention accordingly advantageously refines the prior art without significantly increasing the manufacturing effort or cost. The strain relief principle, namely a ring working together with the holders, is maintained. However, instead of providing the feed cable with an additional strain relief ring in a separate work step, the invention follows an entirely different path. The existing contact, which is fastened by crimping on the feed cable, is only changed by longitudinal subdivision after being mounted on the feed cable. Until the longitudinal subdivision, the installation is performed as in the prior art. The manufacturing of the connection box is also not impaired further after the division step. The additional crimp ring body obtained by the subdivision now forms the strain relief arrangement with the compartment-side holders already provided. Using only one additional work step in relation to the prior art, a strain relief arrangement which meets the stipulated norm for strain relief testing is provided.

The design of the contact according to the invention is possible in that the two crimp rings are only connected by an integral material web longitudinally of the cable before their separation. As a result each crimp ring body carries a section of the material web after the separation.

In this preferred embodiment, the tabs forming the insulation crimp ring already have notches in the later separation plane of the insulation crimp ring, so that the later crimp rings are only still held together by a small material web. This makes the separation of the insulation crimp ring and its subdivision into two crimp rings after installation of the contact on the wire significantly easier.

It is especially preferable and also advisable in regard to the strain relief test if the crimp ring body of the insulation crimp ring facing away from the contact part in the longitudinal direction of the second cable is part of the strain relief arrangement.

In order to compensate for diameter tolerances of the cable or different cable diameters in regard to a specific arrangement of the holders, the crimp ring body of the insulation crimp ring, which forms a strain relief arrangement with the compartment-side holders, forms a transversely or radially projecting shoulder, in particular if the shoulder is mounted supported on the holders to relieve strain.

The method of the invention is advantageous in particular in that only one intermediate step is added between the equipping of the cable, i.e. the connection between cable and contact, and the insertion of the cable in the connection box. In this step, the insulation crimp ring is subdivided into two crimp rings. One of these crimp rings forms a strain relief arrangement with the holders, as in the prior art. As a result, no structural change is to be performed on the side of the connection box either.

A method which is characterized in that the two crimp rings of the insulation crimp ring are only disposed on one another using an integral material web, which is cut through after crimping with the second cable, is especially preferred.

BRIEF DESCRIPTION OF THE DRAWING

The above and other objects, features, and advantages will become more readily apparent from the following description, reference being made to the accompanying drawing in which.

SPECIFIC DESCRIPTION

Figure 1:
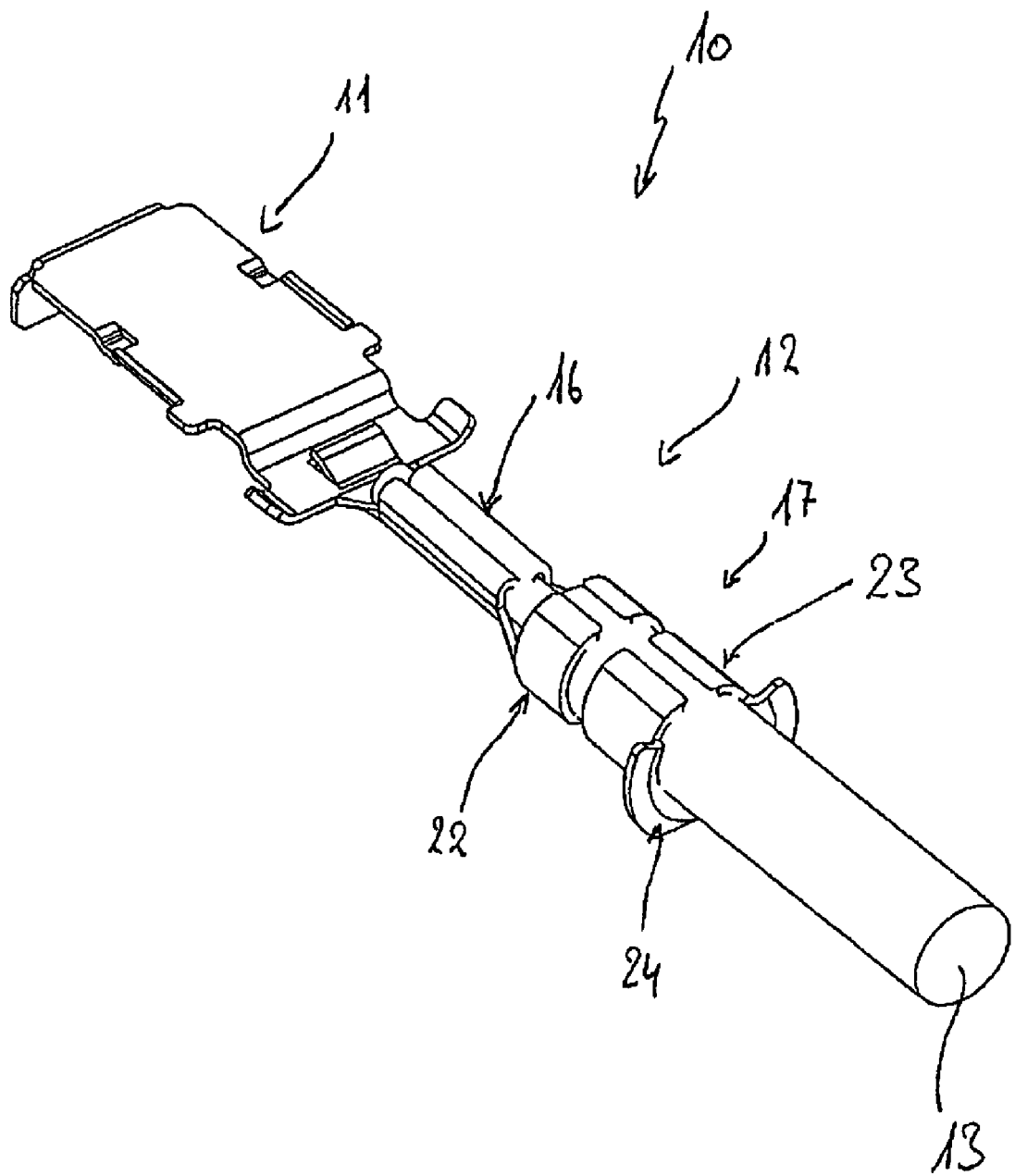
FIG. 1 is a top perspective view of a contact according to the invention on the end of a wire.

As seen in the drawing, a contact 10 has a contact part 11 used for attachment of a first, solar-panel output cable, and a mounting part 12 that connects the part 11 to a second feed cable 13. Electricity generated by the solar panel is fed from the panel into an electricity network using the feed cable 13, which is a standard wire having a conductive core surrounded by an insulating sheath.

Figure 4:
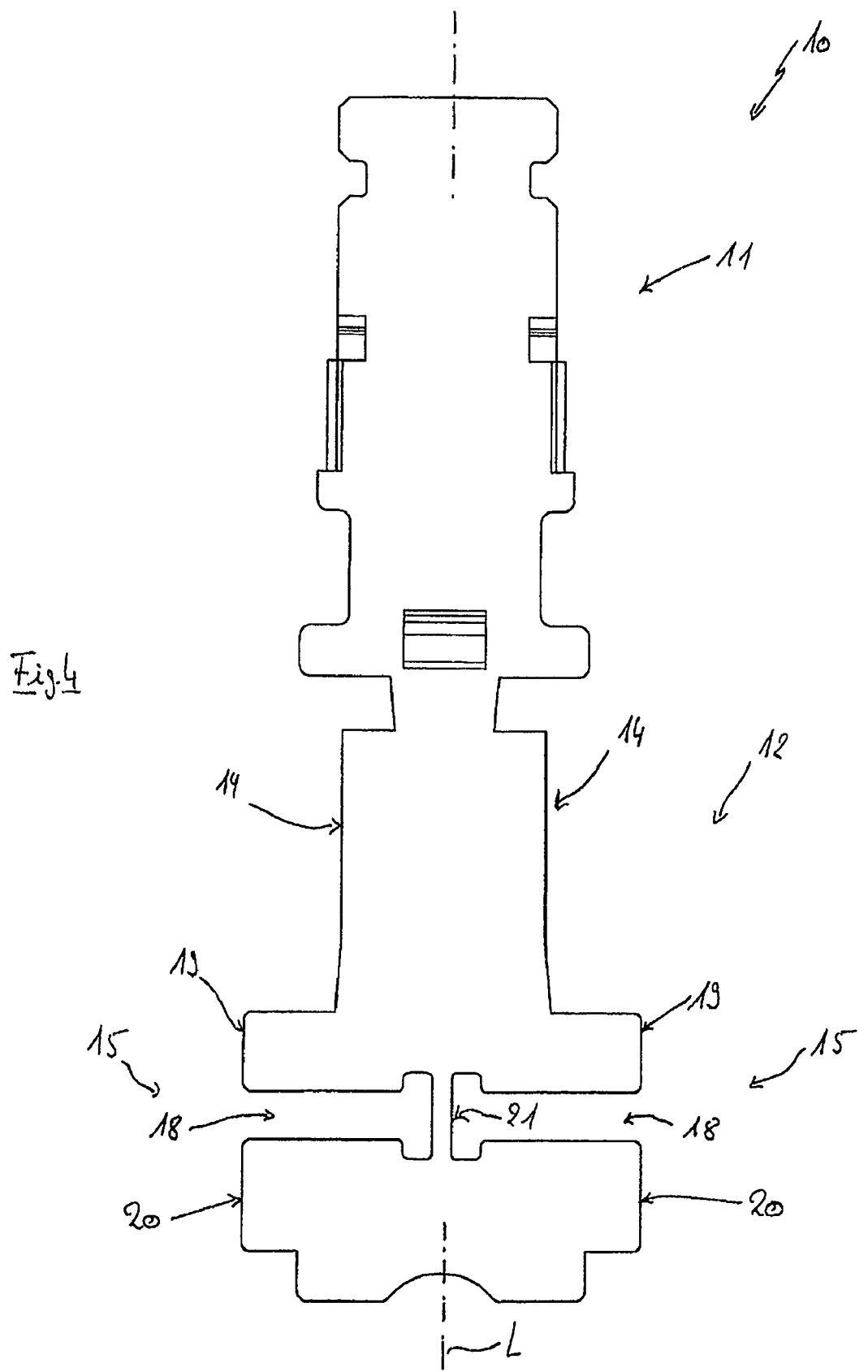
FIG. 4 is a view of the contact with the portion forming the crimp rings shown flattened.

In the illustrated embodiment, the fastening of the feed cable 13 and the contact 10 is done by crimping. To this end, the mounting part 12 of the contact 10 has crimp tabs 14 and 15 that extend transversely to the longitudinal extension of the feed cable 13 and one behind the other in the longitudinal direction of the feed cable 13 (see FIG. 4). The first pair of crimp tabs 14 is adjacent the contact part 11 of the contact 10. This pair of crimp tabs 14 forms a conductor crimp ring 16 that directly grips the stripped end of the conductor of the cable 13 and makes the electrical connection in the assembled state of the contact 10. The crimp tabs 15 remote from the mounting part 12 and also provided in pairs grip the insulation sheath of the cable 13 and thus form the insulation crimp ring 17 in the installed contact 10.

Notches 18 of the crimp tabs 15 subdivide the crimp tabs 18 into outer crimp subtabs 19 and inner crimp subtabs 20. An integral material web 21 that is parallel to the contact longitudinal axis L holds the inner crimp subtabs 20 at a spacing from the outer crimp tabs 19 and thus more remote from the contact part 11 than the outer crimp subtabs 19.

The outer crimp subtabs 19 form an outer crimp ring 22, and the inner pair of crimp subtabs 20 forms an inner crimp ring 23. The crimp rings 22 and 23 jointly form the insulation crimp ring 17. The inner crimp ring 23 remote from the contact part 11 also forms a strain-relief flange or shoulder 24 on its inner end remote from the contact part 11.

Figure 2:
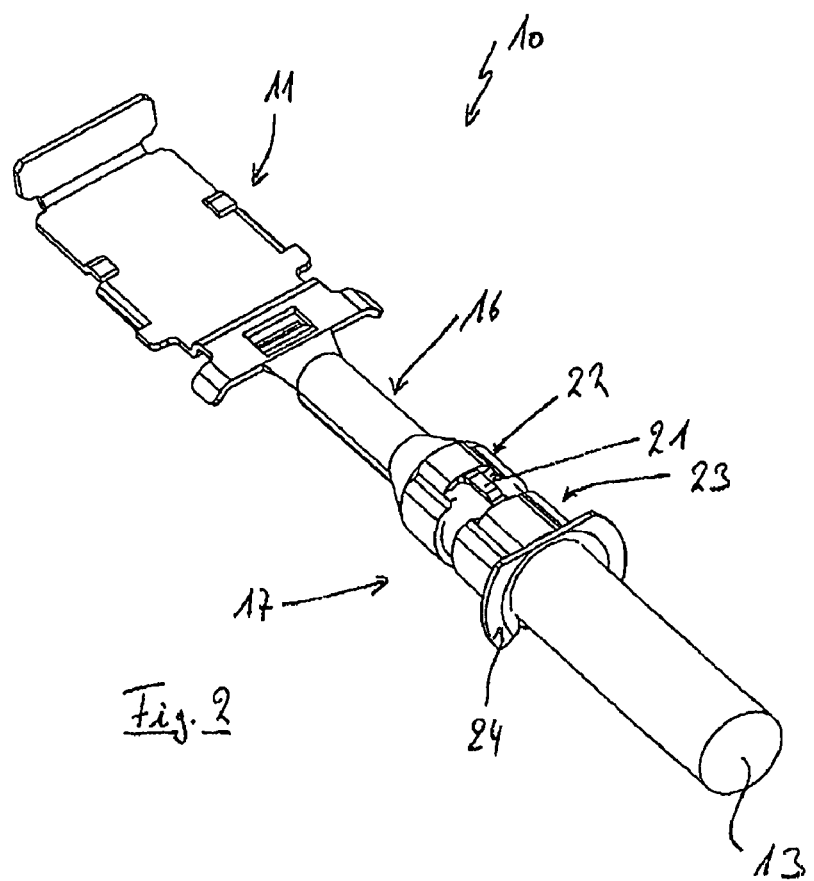
FIG. 2 is a bottom perspective view of the same contact.
Figure 3:
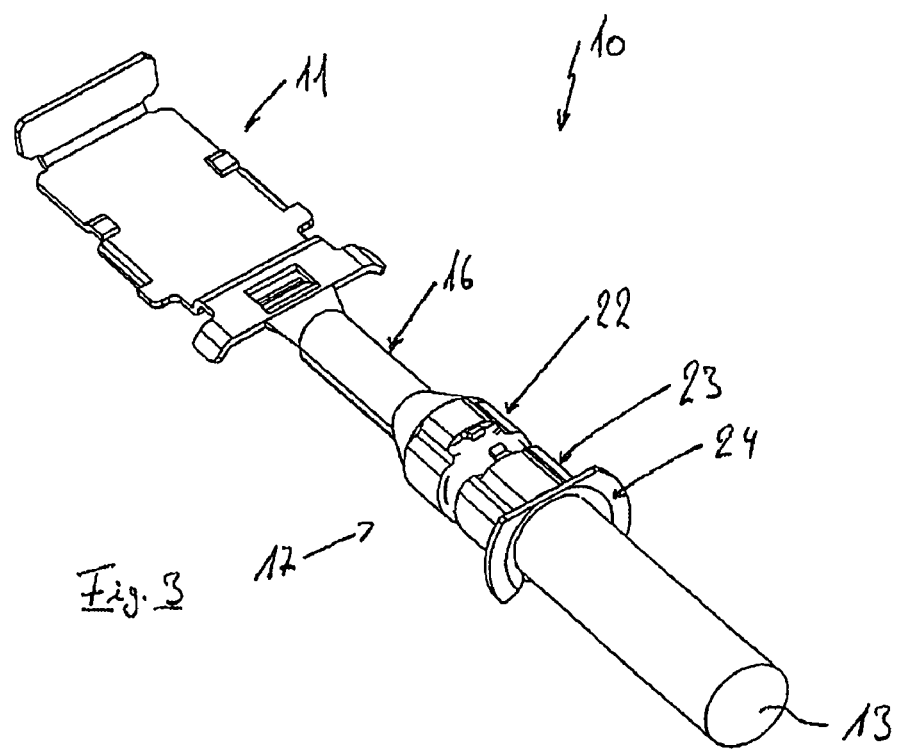
FIG. 3 is a view like FIG. 1 but after separation.

FIG. 2 shows the contact 10 in projection from below The rings 16 and 22 are not yet completely subdivided from the ring 23. The crimp rings 22 and 23 are connected to one another by the unitary sheet-metal web 21. After the material web 21 is cut through according to FIG. 3, the insulation crimp ring 17 is completely subdivided into the crimp rings 22, 23.

The inner crimp ring 22 facing toward the contact part 11 surrounds the insulation sheath of the cable 13 and, together with the conductor crimp ring 16, secures the contact 10 on the cable 13. The inner crimp ring 23 facing away from the contact part 11 forms a component separate from the contact part 11 and can form a strain-relief arrangement with holders of a connection box (not shown), after the web 21 is cut through.

The essential advantage of the invention is that the crimp ring 23 is initially part of the contact 10, so that a separate component does not have to be installed on the cable side. The contact is solely to be crimped on the cable 13 in the typical way. The insulation crimp ring 17 is subdivided by subdividing of the web 21 only in the work step after the contact assembly, in order to form a strain relief ring which is no longer connected to the contact 10 and is used for strain relief. In this way, an auxiliary component of a strain relief arrangement is provided without complex assembly, which meets the requirements of the strain relief test described at the beginning.

We claim:

1. A contact for a solar-power feed cable having a conductive core surrounded by an insulating sheath, the contact comprising:

a conductive contact part adapted to be connected in a solar-power connection box to a conductor and engaging the conductive core of the cable;

an outer crimp ring crimped to the sheath longitudinally of the cable inward from the contact part and unitary with the contact part;

an inner crimp ring spaced longitudinally inward of the cable from the outer crimp ring, crimped to the sheath, and formed with a strain-relief flange; and a longitudinally extending rupturable web unitarily formed with an interconnecting the rings prior to crimping on the cable, whereby after rupturing the web the inner crimp ring is separate from the outer crimp ring and contact part and can serve as a strain relief.

2. The contact defined in claim 1 wherein the flange is a radially outwardly projecting ridge on the inner crimp ring.

3. The contact defined in claim 1 wherein the rings and part are metal.

4. A method of making and installing a contact having:

a conductive contact part adapted to be connected in a solar-power connection box to a conductor and engaging a conductive core surrounded by an insulating sheath of a cable;

an outer crimp ring crimped to the sheath longitudinally of the cable inward from the contact part and unitary with the contact part; and an inner crimp spaced longitudinally inward of the cable from the outer crimp ring, crimped to the sheath, and formed with a strain-relief flange, the method comprising the steps of:

providing an elongated one-piece plastically deformable plate having an outer part and an inner part and formed with a narrow integral web between and interconnecting the inner and outer parts;

crimping an outer end of the outer part around a stripped end of the conductor of the cable;

crimping an inner end of the outer part around the insulation sheath of the cable to form the outer crimp ring;

crimping the inner part around the insulation sheath inward of the outer part inner end to form the inner crimp ring spaced from the outer crimp ring by the web; and thereafter rupturing the web and thereby separating the inner and outer crimp rings.

5. The method defined in claim 4, further comprising the step of forming the inner crimp ring as a part of a strain-relief assembly.

6. The method defined in claim 4 wherein the inner and outer parts and web are unitarily formed with each other of sheet metal.

7. The method defined in claim 4 wherein the plate is formed at the inner end of the outer part with transversely projecting tabs that are bent in to form the outer crimp ring and the inner part is formed with transversely projecting tabs that are also bent in to form the inner crimps ring.

\* \* \* \* \*